Figure 1:
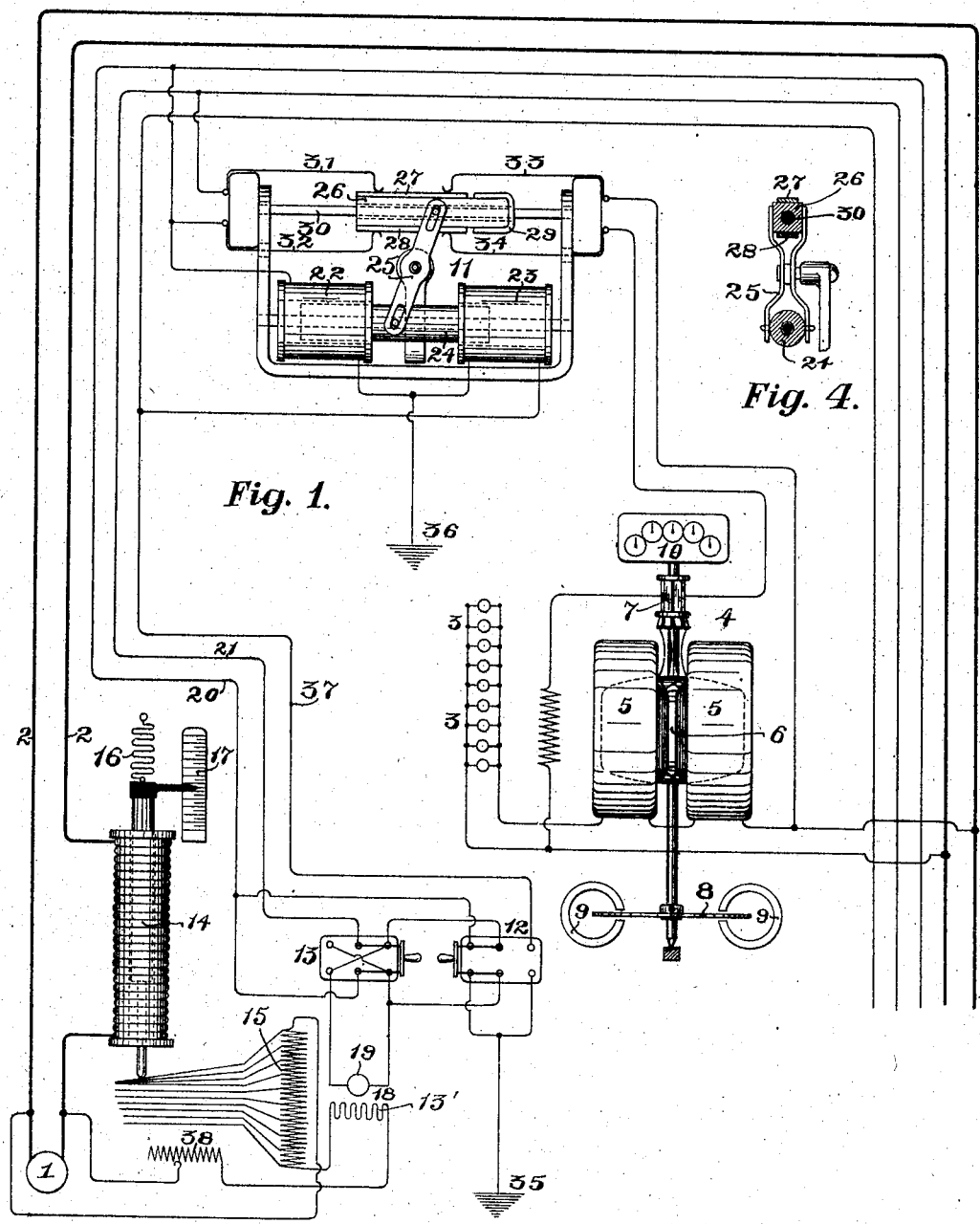

No. 796,042. PATENTED AUG. 1, 1905.
T. DUNCAN.
ELECTRIC METER.
APPLICATION FILED JULY 11, 1901. RENEWED JAN. 7, 1905.

3 SHEETS—SHEET 2.

WITNESSES:
Max H. Label.
Harvey L. Hanson.

By Charles A. Brown
Cragg & Belfield
ATTORNEYS.

INVENTOR.
Thomas Duncan

No. 796,042. PATENTED AUG. 1, 1905.
T. DUNCAN.
ELECTRIC METER.
APPLICATION FILED JULY 11, 1901. RENEWED JAN. 7, 1905.

3 SHEETS—SHEET 3.

WITNESSES:
INVENTOR.
Thomas Duncan
By Charles A. Brown Cragg Belfield
ATTORNEYS.

UNITED STATES PATENT OFFICE.

THOMAS DUNCAN, OF CHICAGO, ILLINOIS.

ELECTRIC METER.

No. 796,042. Specification of Letters Patent. Patented Aug. 1, 1905.

Application filed July 11, 1901. Renewed January 7, 1905. Serial No. 239,969.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to multirate meters, and has for its object the provision of an improved form of meter whose rate of operation per unit of load or energy may be automatically varied upon predetermined change in the current supplied to the system.

In the metering of energy or loads in working circuits it is desired to provide for three different rates of operation of the counting mechanism of the meters per unit of load or energy, one rate of operation, the normal, continuing, say, from six to six in the daytime, another rate of operation, the over rate—that is, above the normal—continuing from six in the evening to twelve midnight, and another rate of operation, the under rate—that is, below the normal—continuing from twelve midnight to six in the morning. The reason for this is that the central station is usually taxed to its utmost between the hours of six and twelve at night, for which, consequently, the consumer who uses power during this time should be charged at a rate in proportion to the cost of the central-station installation, which is equipped for this maximum output required at no other time. Between twelve and six in the morning the station is taxed the least, during which time a minimum amount of apparatus is required, calling for the minimum return upon the investment. Between the hours of six to six in the day-time the central station is not taxed to its limit, nor is it taxed at the minimum, so that the consumer should be charged a rate warranted by the installation necessary to supply the normal demand. Obviously these periods during which the normal, maximum, and minimum rates of operation of the measuring mechanisms per unit of energy or load are required may vary with the season and local conditions.

In practicing my present invention I employ automatically-operated means in the form of an electromagnet or solenoid, which serves to control the pressure of a secondary or pressure generator in accordance with the load put upon the system, and employ in combination with this mechanism means increasing the electromotive force or pressure in the pressure-winding of the meter when the meter is to be operated at an over rate and to cause this secondary pressure to act as counter electromotive force in the circuit, including the pressure-winding of the meter, when the meter is to run at an under rate, the means for controlling the application of the pressure to the pressure-field of the meter also serving to disconnect the pressure-winding from the supplemental source of pressure to permit the meter to run at the normal rate. The solenoid is preferably included in series in one of the mains, and a rheostat is coöperatively associated with the solenoid, which rheostat by being in circuit with the field-winding of the supplemental-pressure generator automatically, through the agency of the solenoid, controls the field, and thereby the degree of secondary pressure impressed upon the meter pressure-winding.

Figure 2:
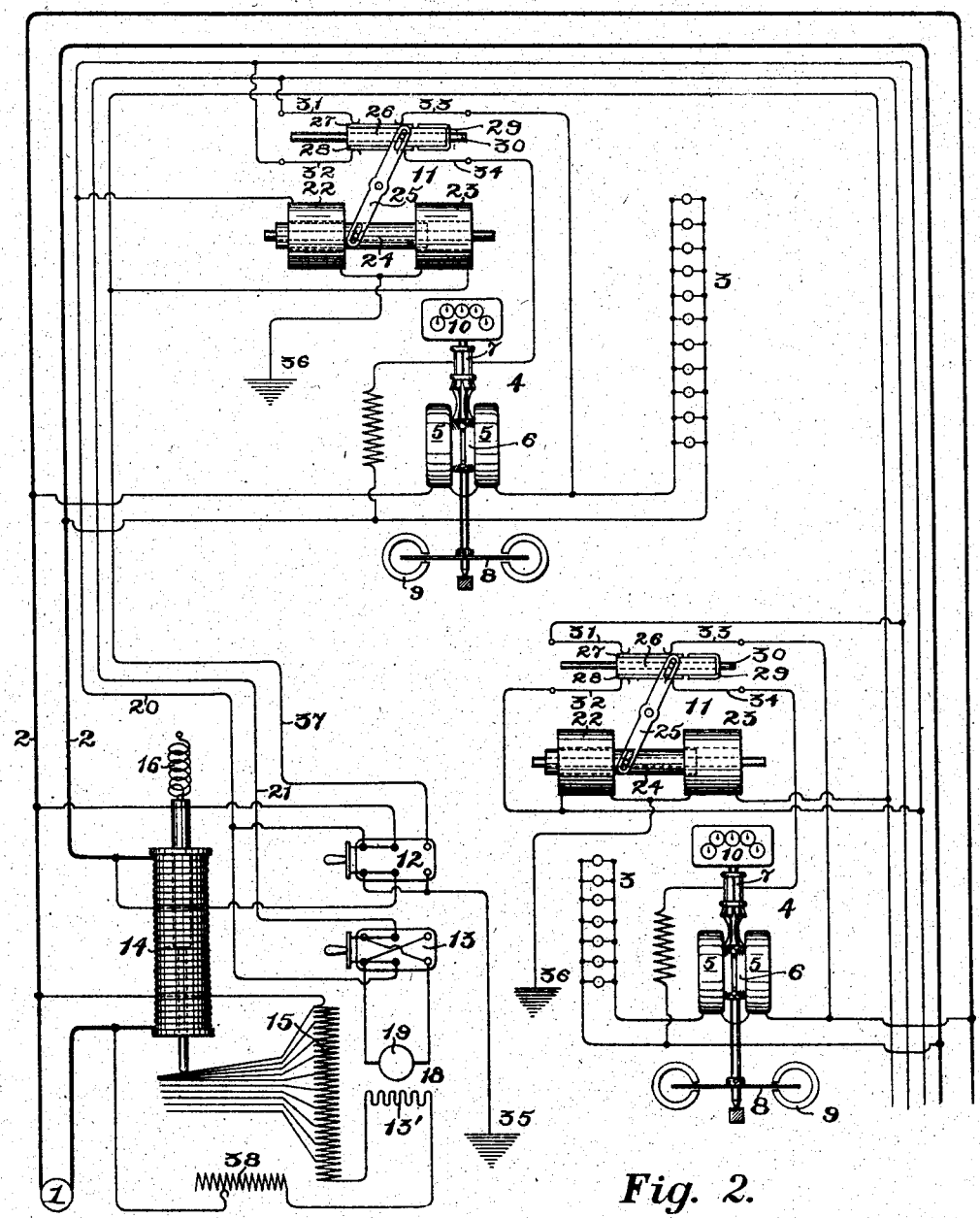
Figure 3:
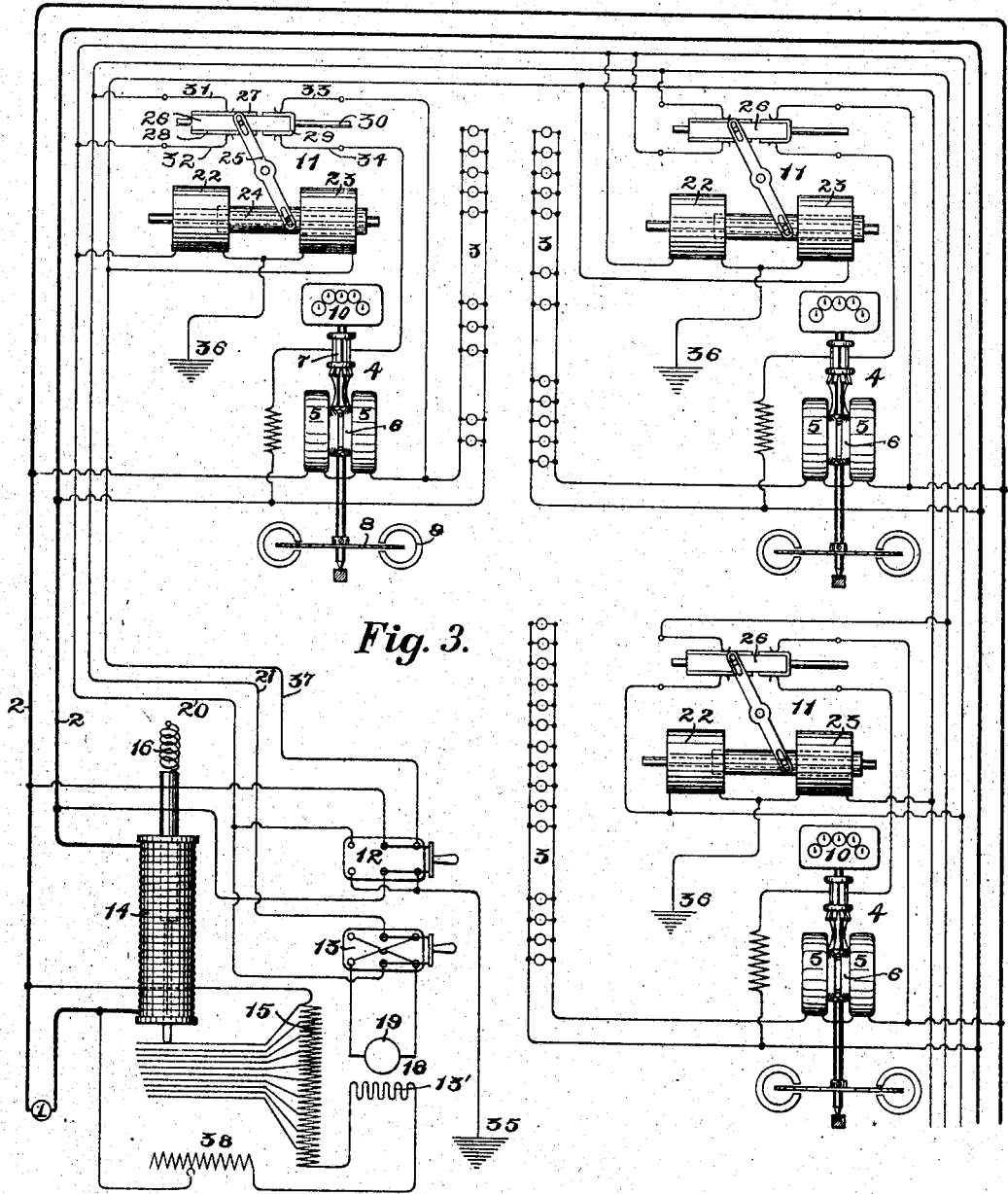

In the drawings, Figures 1, 2, and 3 illustrate systems of electrical distribution with meters and controlling means of my invention associated therewith. Fig. 4 is a detail view of the means for controlling the association of the meter pressure-winding with the secondary pressure-circuit.

Like parts are indicated by similar characters of reference throughout the figures.

In each of the figures is illustrated a generator 1 supplying current over the transmission-mains 2 2 to the translating devices 3 3. Consumers' meters 4 may be located wherever a center of consumption is located—that is, these meters are provided for each customer. Each meter 4 is in this instance illustrated in the form of a commutated motor-meter having its current-winding subdivided into current-coils 5 5 and its pressure-winding in the form of an armature 6, mounted upon a shaft upon which is located the commutator 7, that serves to connect the pressure or armature winding in circuit, which meter may also be provided with the usual damping-disk 8, arranged within the fields of damping-magnets 9 9. Meters of other construction, however, may be employed, and I do not, therefore, wish to be limited to a commutated motor-meter, nor do I wish to be limited to the character of current used in the system of distribution. Counting-trains 10 are illustrated to totalize the measurements of the load.

To effect a change in the rate of operation of the meter per unit of load or energy, I prefer to provide automatically-operated electromagnetic devices 11, that serve to change the field due to the pressure-winding of each meter, three adjustments being preferably provided, one where the pressure-winding produces a field of intermediate strength for the normal operation of the meter, which may occur, for example, between the hours of six and six in the day-time, another for an over-rate operation of the meter where the pressure is stronger—as, for example, between the hours of six and twelve at night—and the third where the pressure-field is at its weakest to operate the meter at a minimum or under rate—as, for example, between the hours of twelve and six in the morning. Each adjusting device is designed by its operation to permit of the normal operation of the meter when the adjusting device is in one condition of operation and to permit of the excess-rate and under-rate operation of the meter when it is in another condition of operation. I will describe an adjusting or changing device 11 hereinafter after having first described some of the apparatus at the central station to be used in coöperation therewith.

At the central station are provided switches 12 and 13 and a governing electromagnet or solenoid 14, provided for the purpose of cutting resistance 15 into and out of circuit. The helix of this solenoid is preferably included in series in one of the main conductors, while the core thereof may be under proper conditions withdrawn from the helix by a coiled spring 16. The core of the solenoid may be provided with an index registering with a scale 17 to indicate the load upon the system. The resistance 15 is in series with the field-winding 13' of a small supplemental generator 18. The armature 19 of the generator is connected with the switch 13, which according to its position may serve to supply current to the armature 6 of each meter to furnish an additive electromotive force or a counter electromotive force.

For the purpose of including the armature 19 in circuit with the meter-armature 6 supplemental-pressure conductors 20 and 21 may be employed, which through the agency of the controlling device 11 are either included in circuit with or excluded from the circuit, including the armature 6. By means of the pole-changing switch 13 the connection of the armarture 19 with the pressure-conductors 20 and 21 may be reversed, so that the pressure in the armature-winding 6 may be increased when the meter is to run at an over rate, or a counter electromotive force may be impressed upon the circuit, including the armature 6, to decrease the field thereof to cause the meter to run at an under rate. If the meter is to run at a normal rate, the supplemental-pressure conductors 20 and 21 are preferably cut out of circuit with the armature 6 by the operation of the changer 11, as will be presently specified.

In the preferred form of the circuit-changer electromagnets in the form of solenoids 22 and 23 are employed, which have a common core 24, with which one end of the centrally-pivoted oscillating switch-actuating lever 25 is engaged. The other end of the switch-actuating lever is engaged with the insulating-mounting 26, upon which are mounted switch-plates 27, 28, and 29, the support 26 being movable longitudinally upon a guiding-rod 30, that passes through the same. Contact-springs 31 and 32 are connected with the supplemental-pressure conductors 20 and 21, while contact-springs 33 and 34 constitute the terminals of the armature or pressure winding 6. When the changer 11 is in the position illustrated in Figs. 1 and 2, the springs 32 34 and 31 33 are connected by means of the plates 27 and 28, whereby the supplemental-pressure conductors 20 and 21 are included in circuit with the armature 6, so that the armature may be subject to an additive electromotive force to increase its rate of operation—as, for example, between the hours of six and twelve at night—or the armature may be subject to a counter electromotive force to decrease its rate of operation—as, for example, between the hours of twelve and six in the morning. If the meter is to run at a normal rate, the changers are placed in the positions illustrated in Fig. 3, where the supplemental conductors 20 and 21 are cut out of circuit, the terminal-springs 33 and 34 being directly connected by the switch portion 29, in which condition the armature 6 is subject only to the pressure between the mains.

For controlling the operation of the solenoids of the changers the switch 12 is employed. With the switch mechanism at the central station in the position shown in Fig. 1 the solenoid 22 has being energized, circuit through the same being traced from the ground 35 through the supplemental-pressure conductor 20 and the solenoid 22 to the ground 36, current being supplied from the supplemental source of pressure 18. To cut the armature 6 out of circuit, the switch 12 is reversed, current then being traced from the ground 35 through the generator 18, the conductor 37, and solenoid 23 to the ground 36. When the supplemental-pressure conductors 20 and 21 are included in circuit with the armature 6, the counter electromotive force or the additive electromotive force impressed upon the armature, according to the position of the switch 13, is automatically varied by the electromagnet or solenoid 14, whose core or armature cuts out resistance 15 on an increase in current and permits the reinclusion of said resistance upon a decrease in current, thereby respectively effecting an increase and decrease in the supplemental electromotive force impressed upon the supplemental-pressure conductors 20 and 21 and the armature 6 in circuit therewith. Thus as the load upon the system increases the resistance 15 is cut out to cause the armature 6 to run faster when the supplemental electromotive force is added and to run slower when the supplemental electromotive force opposes the electromotive force impressed upon the armature from the distributing-mains. When normal rate is required, the switch 13 is preferably on open circuit. In changing the meter from a normal rate to an over or under rate instrument the switch 12 is thrown to the left, as indicated in Fig. 1, and operated a number of times to insure the connection of the armature or pressure winding with the supplemental-pressure conductors 20 and 21, whereafter the switch 13 is thrown to the right, which may, for example, cause the meter to run at an over rate, or the switch 13 is thrown to the left if the meter is to run at an under rate. In changing the meters to instruments operating at normal rates the switch 12 is thrown to the right and opened and closed several times to insure an engagement between the switch parts 29 with the springs 33 and 34 of each changer.

To compensate for the removal and inclusion of meters, an adjustable resistance 38 may be employed in series with the pressure field-winding of the auxiliary-pressure generator. The ammeter-scale 17 serves to assist in the adjustment of percentages.

In Figs. 2 and 3 the solenoids 22 and 23 may be operated by current from the mains.

While I have herein shown and particularly described the preferred embodiment of my invention, I do not wish to be limited to the precise embodiment thereof herein set forth, as it is obvious that changes may readily be made without departing from the spirit thereof; but—

Having thus described my invention, I claim as new and desire to secure by Letters Patent—

1. The combination with a current-generator, of a meter, a supplemental-pressure generator, means for changing the pressure of this generator, a solenoid for governing the means, the said solenoid being subject to the current in the system, thereby having its strength vary with the current whereby the supplemental pressure is correspondingly varied, and conductors for including a winding of the meter in circuit with the supplemental-pressure generator, substantially as described.

2. The combination with a current-generator, of a meter, a supplemental-pressure generator, means for changing the pressure of this generator, a solenoid for governing the means, the said solenoid being subject to the current in the system, thereby having its strength vary with the current, whereby the supplemental pressure is correspondingly varied, conductors for including a winding of the meter in circuit with the supplemental-pressure generator, and a pole-changing switch for changing the direction of the supplemental pressure, substantially as described.

3. The combination with a current-generator, of a meter, a supplemental-pressure generator, means for changing the pressure of this generator, a solenoid for governing the means, the said solenoid being subject to the current in the system, thereby having its strength vary with the current, whereby the supplemental pressure is correspondingly varied, conductors for including the pressure-winding of the meter in circuit with the supplemental-pressure generator, switching mechanism for including the pressure-winding of the meter in circuit with the supplemental-pressure conductors and excluding the pressure-winding of the meter from circuit with these conductors, electromagnetic mechanism for controlling the operation of the switching mechanism, and switching mechanism at the central station for operating the electromagnetic mechanism, substantially as described.

4. The combination with a current-generator, of a meter, a supplemental-pressure generator, means for changing the pressure of this generator, a solenoid for governing the means, the said solenoid being subject to the current in the system, thereby having its strength vary with the current whereby the supplemental pressure is correspondingly varied, conductors for including the pressure-winding of the meter in circuit with the supplemental-pressure generator, a pole-changing switch for changing the direction of the supplemental pressure, switching mechanism for including the pressure-winding of the meter in circuit with the supplemental-pressure conductors and excluding the pressure-winding of the meter from circuit with these conductors, electromagnetic mechanism for controlling the operation of the switching mechanism, and switching mechanism at the central station for operating the electromagnetic mechanism, substantially as described.

5. The combination with a current-generator, of a meter, a supplemental-pressure generator, a resistance 15 in circuit with a winding of the supplemental-pressure generator, a switching device for cutting sections of the resistance into and out of circuit with the said supplemental-generator winding, a solenoid for operating the said switching device, said solenoid being subject to the current in the system, thereby having its strength vary with the current, whereby the supplemental pressure is correspondingly varied through the agency of the said resistance and the switching device associated therewith, and conductors for including the pressure-winding of the meter in circuit with the supplemental-pressure generator, substantially as described.

6. The combination with a current-generator, of a meter, a supplemental-pressure generator, a resistance 15 in series with the field-winding of the supplemental-pressure generator, a switching device for cutting sections of the resistance into and out of circuit with the said supplemental-generator winding, a solenoid for operating the said switching device, said solenoid being subject to the current in the system, thereby having its strength vary with the current, whereby the supplemental pressure is correspondingly varied through the agency of the said resistance and the switching device associated therewith, and conductors for including the pressure-winding of the meter in circuit with the supplemental-pressure generator, substantially as described.

7. The combination with a current-generator, of a supplemental source of pressure, meters each having current and pressure windings located at a district of consumption, conductors for impressing the pressure from the supplemental-pressure generator upon the pressure-windings of the meters, and an adjusting device 38 to adjust the supplemental pressure to the number of meters in the system, substantially as described.

8. In a system of electrical distribution, the combination with an electric meter, of a supplemental-pressure generator, means for varying the pressure of this generator in proportion to the variation of current in the system, and conductors for including a winding of the meter in circuit with the supplemental-pressure generator, substantially as described.

9. In a system of electrical distribution, the combination with an electric meter, of a supplemental-pressure generator, automatic electromagnetic means for varying the pressure of this generator in proportion to the variation of current in the system, and conductors for including a winding of the meter in circuit with the supplemental-pressure generator, substantially as described.

10. The combination with a current-generator, of a meter, a supplemental-pressure generator, electromagnetic means for changing the pressure of this generator, and conductors for including a winding of the meter in circuit with the supplemental-pressure generator, substantially as described.

11. The combination with a current-generator, of a meter, a supplemental-pressure generator, means for changing the pressure of this generator, an electromagnetic device for governing the means, the said electromagnetic device being subject to the current in the system, thereby having its strength vary with the current whereby the supplemental pressure is correspondingly varied, and conductors for including a winding of the meter in a circuit with the supplemental-pressure generator, substantially as described.

12. The combination with a current-generator, of a meter, a supplemental-pressure generator, means for changing the pressure of this generator, an electromagnetic device for governing the means, the said electromagnetic device being subject to the current in the system, thereby having its strength vary with the current, whereby the supplemental pressure is correspondingly varied, conductors for including a winding of the meter in circuit with the supplemental-pressure generator, and a pole-changing switch for changing the direction of the supplemental pressure, substantially as described.

13. The combination with a current-generator, of a meter, a supplemental-pressure generator, means for changing the pressure of this generator, an electromagnetic device for governing the means, the said electromagnetic device being subject to the current in the system, thereby having its strength vary with the current, whereby the supplemental pressure is correspondingly varied, conductors for including the pressure-winding of the meter in circuit with the supplemental-pressure generator, switching mechanism for including the pressure-winding of the meter in circuit with the supplemental-pressure conductors and excluding the pressure-winding of the meter from circuit with these conductors, electromagnetic mechanism for controlling the operation of the switching mechanism, and switching mechanism at the central station for operating the electromagnetic mechanism, substantially as described.

14. The combination with a current-generator, of a meter, a supplemental-pressure generator, means for changing the pressure of this generator, an electromagnetic device for governing the means, the said electromagnetic device being subject to the current in the system, thereby having its strength vary with the current, whereby the supplemental pressure is correspondingly varied, conductors for including the pressure-winding of the meter in circuit with a supplemental-pressure generator, a pole-changing switch for changing the direction of the supplemental pressure, switching mechanism for including the pressure-winding of the meter in circuit with the supplemental-pressure conductors and excluding the pressure-winding of the meter from circuit with these conductors, electromagnetic mechanism for controlling the operation of the switching mechanism, and switching mechanism at the central station for operating the electromagnetic mechanism, substantially as described.

15. The combination with a current-generator, of a meter, a supplemental-pressure generator, a resistance 15 in circuit with a winding of the supplemental-pressure generator, a switching device for cutting sections of the resistance into and out of circuit with the said supplemental-generator winding, an electromagnetic device for operating the said switching device, said electromagnetic device being subject to the current in the system, thereby having its strength vary with the current, whereby the supplemental pressure is correspondingly varied through the agency of the said resistance and the switching device associated therewith, and conductors for including the pressure-winding of the meter in circuit with the supplemental-pressure generator, substantially as described.

16. The combination with a current-generator, of a meter, a supplemental-pressure generator, a resistance 15 in series with the field-winding of the supplemental-pressure generator, a switching device for cutting sections of the resistance into and out of circuit with the said supplemental-generator winding, an electromagnetic device for operating the said switching device, said electromagnetic device being subject to the current in the system, thereby having its strength vary with the current, whereby the supplemental pressure is correspondingly varied through the agency of the said resistance and the switching device associated therewith, and conductors for including the pressure-winding of the meter in circuit with the supplemental-pressure generator, substantially as described.

17. The combination with a generator, of a meter, a supplemental-pressure generator, and means for changing the pressure of this generator, a winding of the meter being in circuit with the supplemental-pressure generator, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.